United States Patent
Hatton et al.

[11] Patent Number: 5,866,082
[45] Date of Patent: Feb. 2, 1999

[54] HAND-HELD OZONE-PRODUCING APPARATUS

[75] Inventors: Christopher W Hatton, Freelton; Michael Bussiere, Hamilton; Richard A Zirger, Oakville, all of Canada

[73] Assignee: Omega 5 Technologies Inc., Hamilton, Canada

[21] Appl. No.: 824,975

[22] Filed: Mar. 27, 1997

[51] Int. Cl.[6] ................................................. C01B 13/11
[52] U.S. Cl. ............................................... 422/186.07
[58] Field of Search ....................................... 422/186.07

[56] References Cited

U.S. PATENT DOCUMENTS

| | | | |
|---|---|---|---|
| 499,572 | 6/1893 | Oudin | 422/186.07 |
| 565,952 | 8/1896 | Andreoli | 422/186.07 |
| 1,505,669 | 8/1924 | Quain | 422/186.07 |
| 2,745,407 | 5/1956 | Mueller et al. | 128/407 |
| 4,051,045 | 9/1977 | Yamamoto et al. | 250/536 |
| 4,461,744 | 7/1984 | Erni et al. | 422/486.18 |
| 5,268,151 | 12/1993 | Reed, et al. | 422/186.16 |
| 5,407,639 | 4/1995 | Watanabe et al. | 422/186.07 |
| 5,503,808 | 4/1996 | Gerbutt et al. | 422/186.08 |
| 5,505,914 | 4/1996 | Tona-Serra | 422/186.12 |
| 5,545,379 | 8/1996 | Gray | 422/186.04 |
| 5,587,131 | 12/1996 | Malkin et al. | 422/186.11 |

*Primary Examiner*—Daniel J. Jenkins
*Attorney, Agent, or Firm*—Anthony Asquith & Co.

[57] ABSTRACT

A skin-treatment device includes a hand-held wand, having a glass bulb, through which sparks are applied to the skin, and which generate ozone. The wand is self-contained, all the electrical components, including transformers, charging capacitors, etc, being housed in the hand-held casing. A lead connects the wand to the 110 v AC mains. The bulb is glued to the high-voltage electrode, whereby even if the bulb is broken the electrode remains covered. The spark is produced by discharging a capacitor into the primary of a spark transformer. The primary capacitor is charged during one half of the AC cycle, and the voltage on the primary capacitor is increased by charge from an auxiliary capacitor, which is charged on the other half of the cycle.

16 Claims, 6 Drawing Sheets

HAND-HELD OZONE-PRODUCING APPARATUS

BACKGROUND TO THE INVENTION

This invention relates to a hand-held wand, which, when held in close proximity to the skin, creates electrical sparks. The sparks produce ozone gas in the immediate area, i.e in close proximity to the skin. The ozone is a strong oxidiser, which is beneficial in eradicating bacteria in the skin surface area.

The beneficial effects of electrical sparks, and the resulting ozone, on the skin are well-established, and it has been a conventional practice in beauty salons to provide a spark/ozone producing apparatus for the purpose. However, the conventional apparatuses have had certain disadvantages. For instance, the conventional apparatus has included not only the hand-held wand, but has had to include also an isolation transformer. The isolation transformer is large and heavy—so much so that generally it has had to be positioned on a nearby table, being too cumbersome to be incorporated into the hand-held wand of the apparatus. The isolation transformer was necessary to prevent persons from being exposed directly to mains electricity in the event of a breakage in the apparatus.

In any apparatus that is powered from the AC mains, care must be taken to prevent the user from being exposed to an electric shock in the event of a misuse or breakage of the apparatus. Also, of course, there are regulations to be met, which require certain safety standards for mains-powered apparatus. In the case of a hand-held apparatus, the designer would prefer, if it were possible, for the apparatus to be battery-powered, or at least for the apparatus to use a power supply that is transformed down to low voltage, because then there would be no safety regulations.

However, mains-power is favoured in the case of a spark-producing apparatus of the kind with which the invention is concerned. In such apparatus, the spark is provided by the process of charging a capacitor, and of then rapidly discharging the capacitor through the primary of a spark-inducing transformer. The rapidity with which the capacitor can be discharged into the primary of the spark transformer depends on the impedance of the circuit connecting the capacitor and primary, and depends on the voltage to which the capacitor has been charged.

It has been found that charging the capacitor to a voltage derived from the untransformed mains is not enough to achieve the desired rapid spark discharge-times. In other words, to get a good spark, the mains voltage needs to be stepped up, not stepped down. Thus, powering the spark device by means of a battery, or from a transformed-down mains-derived supply, has been found to be unsatisfactory, attractive though those power systems are from the safety standpoint.

The conventional isolation transformer was used not only to isolate the person from the possibility of direct contact with the mains, but was used also to step up the mains voltage to a level at which the spark capacitor could discharge its energy very rapidly into the primary. However, this conventional structure was cumbersome and expensive—so much so, that the apparatus could not be considered practical for occasional home use, by untrained persons. If a person wished to undergo a course of ozone treatment, for the removal of skin blemishes for example, the person had to pay regular visits to the beauty salon where the apparatus was located.

GENERAL FEATURES OF THE INVENTION

The apparatus as described herein is of such a construction as to be so inherently safe that the hand-held apparatus may be supplied directly from the AC mains. One key to safety is to make sure that the user cannot get a mains-derived shock during normally-to-be-expected breakages. As will be described, the manner of mounting the high-voltage-carrying components of the hand-held wand is such that those components substantially never can become exposed, even when some of the components are broken.

That being so, the hand-held apparatus can be self-contained as to the components required to produce the spark. There is no need for some of the components to be located in the wand, while other components are located on a nearby table: now, all the components can be located in the wand. The only connection to the wand is the mains lead, i.e the lead that carries the plug for plugging the apparatus into a wall socket.

Now, there is no need for an isolation transformer. However, in the absence of the isolation transformer, some other means is required for stepping up the mains voltage to a level at which the capacitor can produce a good quality (i.e high-energy, short-lived) spark. As will be described, the voltage to the spark capacitor is boosted by providing an auxiliary capacitor, the voltage of the charge on which is aggregated to the mains voltage, for the purpose of charging the spark capacitor.

As will be described, an auxiliary capacitor can be used to boost the voltage on the spark capacitor. The auxiliary capacitor is charged in one half of the AC cycle; the spark capacitor is charged in the other half of the cycle, and the voltage of the auxiliary capacitor is added to the voltage derived from the mains, to (nearly) double the voltage at the spark capacitor, and it has been found that this is enough to ensure a good quality spark.

THE PRIOR ART

Patent publications U.S. Pat. No. 5,505,914 (Tonna-Serra, Apr 1996) and U.S. Pat. No. 2,745,407 (Mueller, Feb 1954) show examples of hand-held apparatus for producing ozone when placed in close proximity to the skin.

Structures relating to ozone production per se are shown in patent publications: U.S. Pat. No. 4,051,045; U.S. Pat. No. 4,461,744; U.S. Pat. No. 5,268,151; U.S. Pat. No. 5,407,639; U.S. Pat. No. 5,503,808; U.S. Pat. No. 5,545,914; U.S. Pat. No. 5,545,379; U.S. Pat. No. 5,587,131.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
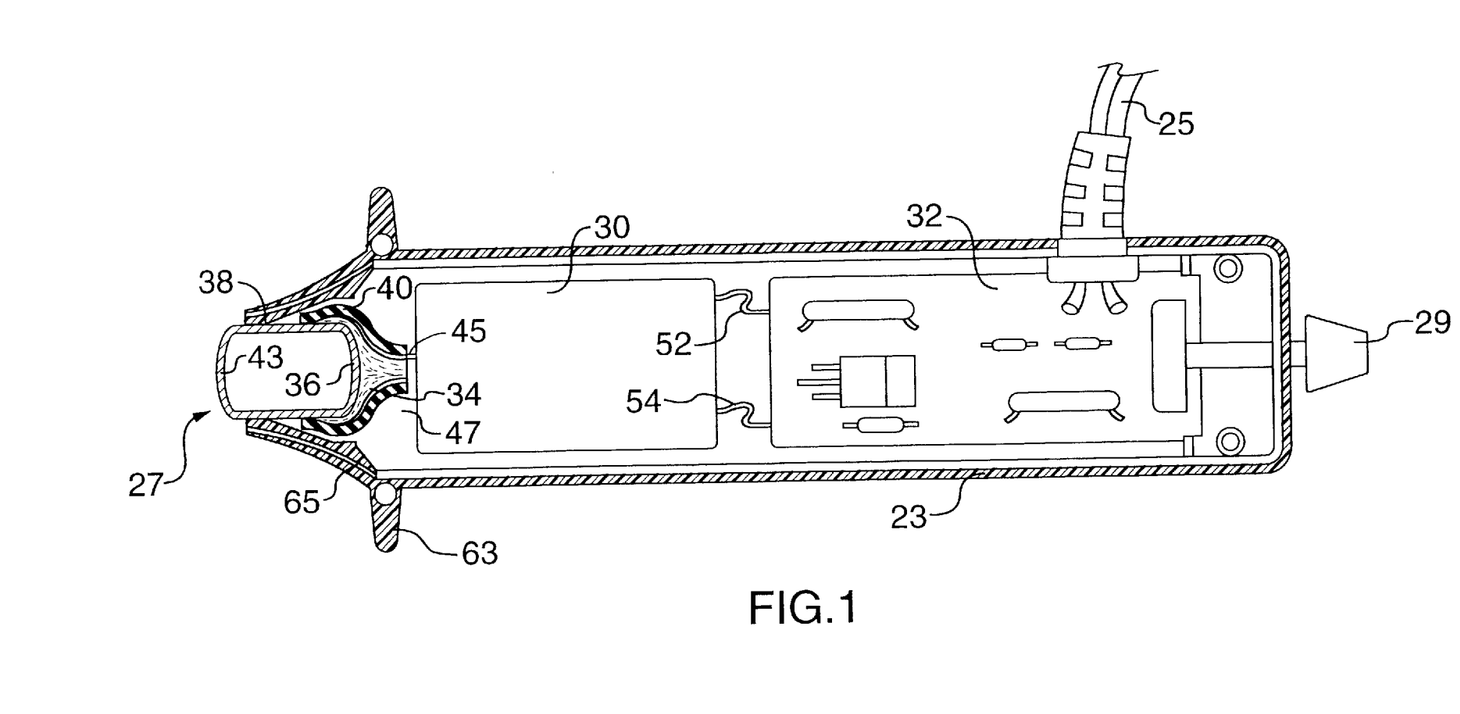
FIG. 1 is a partly cross-sectioned plan view of an apparatus that embodies the invention.

The apparatus shown in FIG. 1 comprises a hand-held wand 20, which includes a casing 23 of rigid plastic. An electrical lead 25 is provided, for connecting the 110-volt AC mains to the wand. The unit as shown in FIG. 1 has an overall length of approximately 16 cm.

A glass bulb 27 protrudes from one end of the casing 23. During operation, a person holds the wand against the skin, or a small distance away from the skin, whereby sparks jump from the bulb to the skin. This gives rise to ozone production, and the therapeutic effect as described. A control knob 29 enables the person to control the strength of the spark.

In addition to the glass bulb 27, inside the casing 23 is a spark-inducing transformer 30; and also, an electrical circuit, mounted on a board 32, for supplying a pulse of electrical energy to the transformer 30.

One of the problems, when using mains electricity directly, in a hand-held apparatus containing a glass bulb, is that the electrically-live components should not become open, and exposed, in the event that the glass is broken. That is to say, the designer of the apparatus should see to it that, even if the glass breaks, the electrically live components, especially any that may have a very high voltage, cannot become exposed. Indeed, the designer should see to it that the high-voltage electrically-live components cannot be touched even if a person should probe into the broken glass area with a piece of conducting material.

This requirement is addressed in the apparatus of FIG. 1. The glass bulb 27 is filled with an inert gas such as neon, and sealed. If the bulb should break, the neon escapes, and the bulb is no longer able to conduct electrical energy, nor to produce a spark. Glass is, of course, likely to break if knocked or otherwise abused. When considering how to hold the bulb in place, the designer therefore should avoid methods such as gripping or squeezing the glass bulb. In the apparatus, the glass bulb 27 is held in place by adhesive.

The electrode by which the gas in the glass bulb is ionized, during operation, comprises a body of metal (aluminum) foil 34, which is secured, by adhesive, to the back end 36 of the bulb 27. The adhesive, or glue, is selected on the basis that it adheres to both aluminum and glass, of course.

The foil 34 may be wrapped partly around the cylindrical portion of the glass bulb 27, in which case the glue should extend also into the foil-covered area of the cylindrical portion. The designer should see to it that even the front-most extremity of the foil is glued to the glass.

On the other hand, the foil and the glue should not extend too far forwards. The bulb is located in its place by virtue of being constrained within the cylindrical aperture 38 of the plastic casing. The plastic casing is in two halves, which are pressed tightly together during assembly of the wand 20: and the glass bulb is all too easily broken if there is any glue or foil present between the glass and the plastic at 38.

The foil 34 is also enwrapped within a sleeve 40 of insulating material, which in this case is heat-shrinkable plastic. The plastic is shrunk around the glass and foil, as shown. The plastic is of the type that is coated with heat sensitive adhesive, such that not only does heating the sleeve cause it to shrink, but also serves to activate the adhesive, whereby the sleeve is not only shrunk in place, but is also glued in place. Again, it must be ensured that the plastic does not obtrude into the area of the glass that will lie in the aperture 38 of the casing.

The adhesive holds the back end 36 of the bulb 27 to the electrode 34. The front end 43 of the bulb is free, whereby, if the glass breaks (at the front) the broken pieces of glass are free to fall away, leaving the back end 36 of the bulb still intact, and still covering the electrically-live parts 34. Even if the back end 36 of the bulb breaks also, at least the broken pieces will likely be held in place, covering the foil of the electrode 34, and preventing access to the foil.

Thus, the back end 36 of the bulb comprises an electrode-overlying portion of the glass, that remains in the electrode-overlying condition, even if the glass bulb should be broken. Of course, a scenario is theoretically possible, in which the foil does become exposed as a result of breakage: the emphasis in the apparatus as described is on making such a scenario highly unlikely, rather than impossible.

The foil is soldered to the lead 45, which projects forwards from the transformer 30. The sleeve 40, when correctly placed, serves to overlie the lead 25 and the soldered area also The casing 23 is shaped to form a cavity 47 between the bulb and the transformer, and the area within the cavity is potted with insulating material during assembly.

Figure 2:
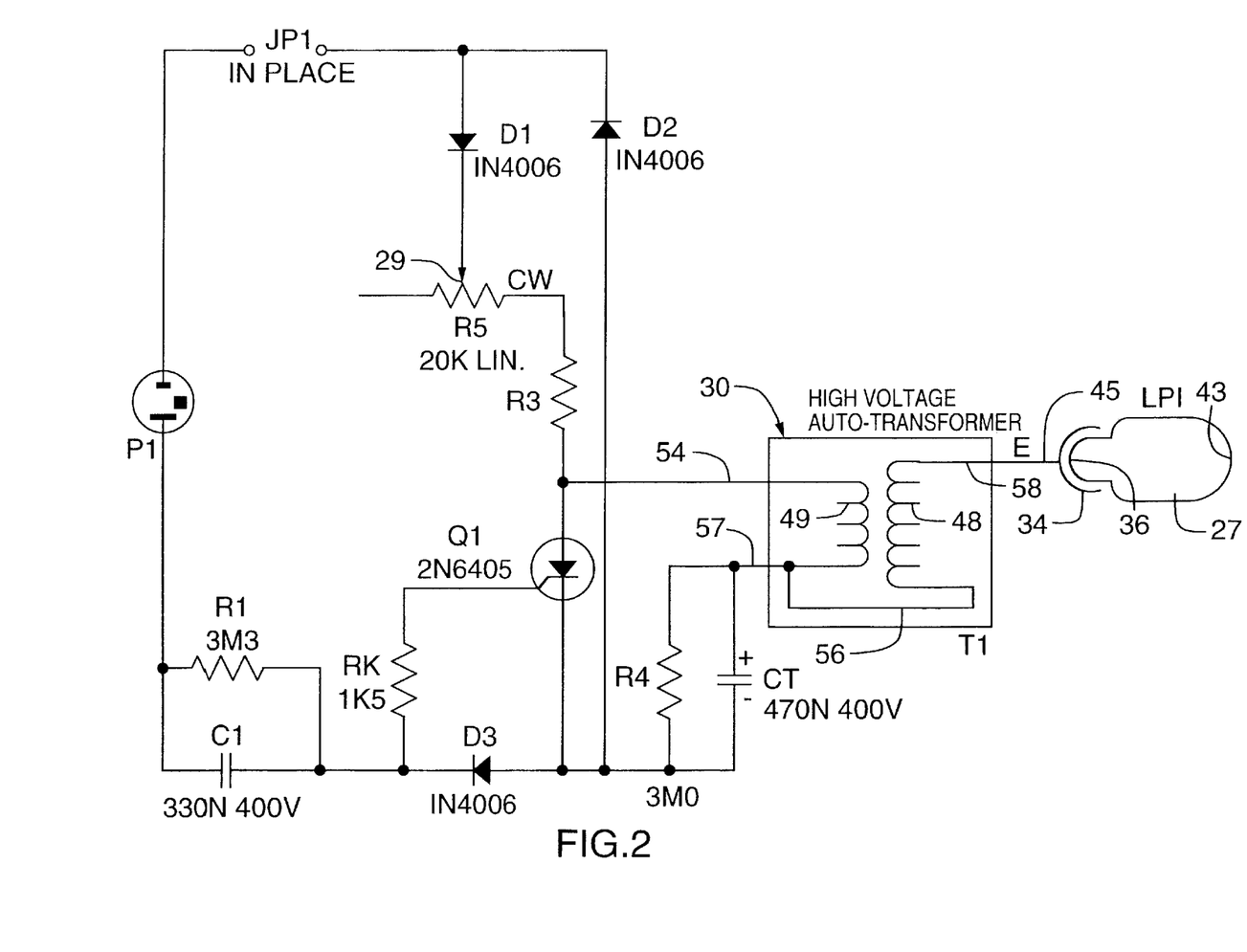
FIG. 2 is a circuit diagram of the spark-producing circuit of the apparatus of FIG. 1.
Figure 2A:
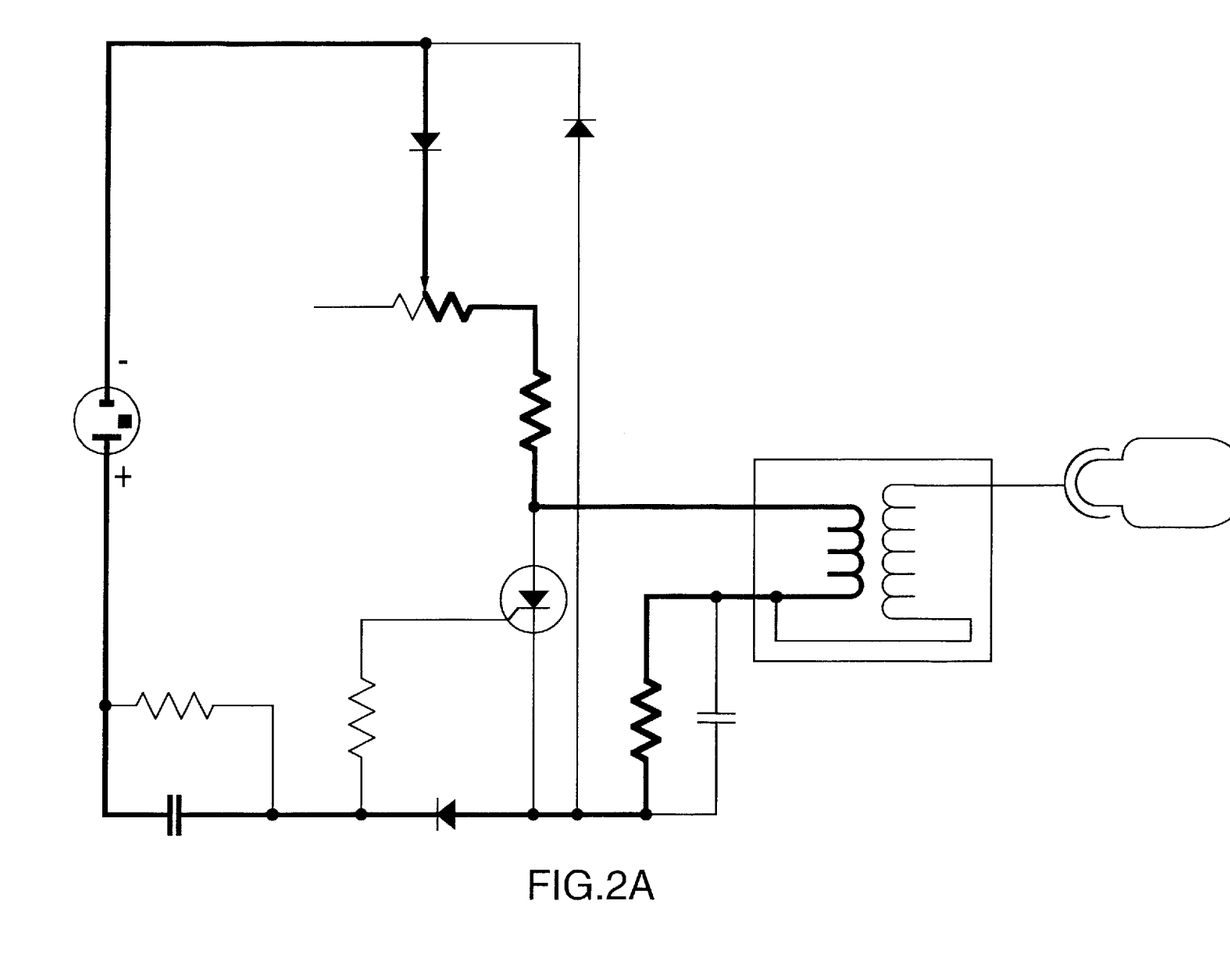
FIG. 2a is the same diagram as FIG. 2, showing the effect on the circuit when the voltage supplied is in the positive half of the AC cycle.

The electrical circuit will now be described. FIG. 2 shows the electrical arrangement. FIG. 2a shows the situation during the positive-going half of the AC cycle. Here, diodes D1 and D3 are conducting, and voltage from the mains is applied to the primary capacitor C2. C2 can, by this means, be charged up to the peak voltage of the 110 volt AC mains, which is about 155 volts. In addition, charge already present on the auxiliary capacitor C1 will be added to the voltage on the primary capacitor C2.

The presence of charge on C1 means that C2 can be charged to a higher voltage than would be available to C2 from the mains alone. In fact, given that the auxiliary capacitor C1 is itself charged to the 110 v AC peak of 155 volts, and that the voltage on C1 is added to the voltage available to charge C2, it should be possible theoretically to achieve 310 volts in C2; in practice, it has been found that a charge of 290 volts can be achieved in C2.

Figure 2B:
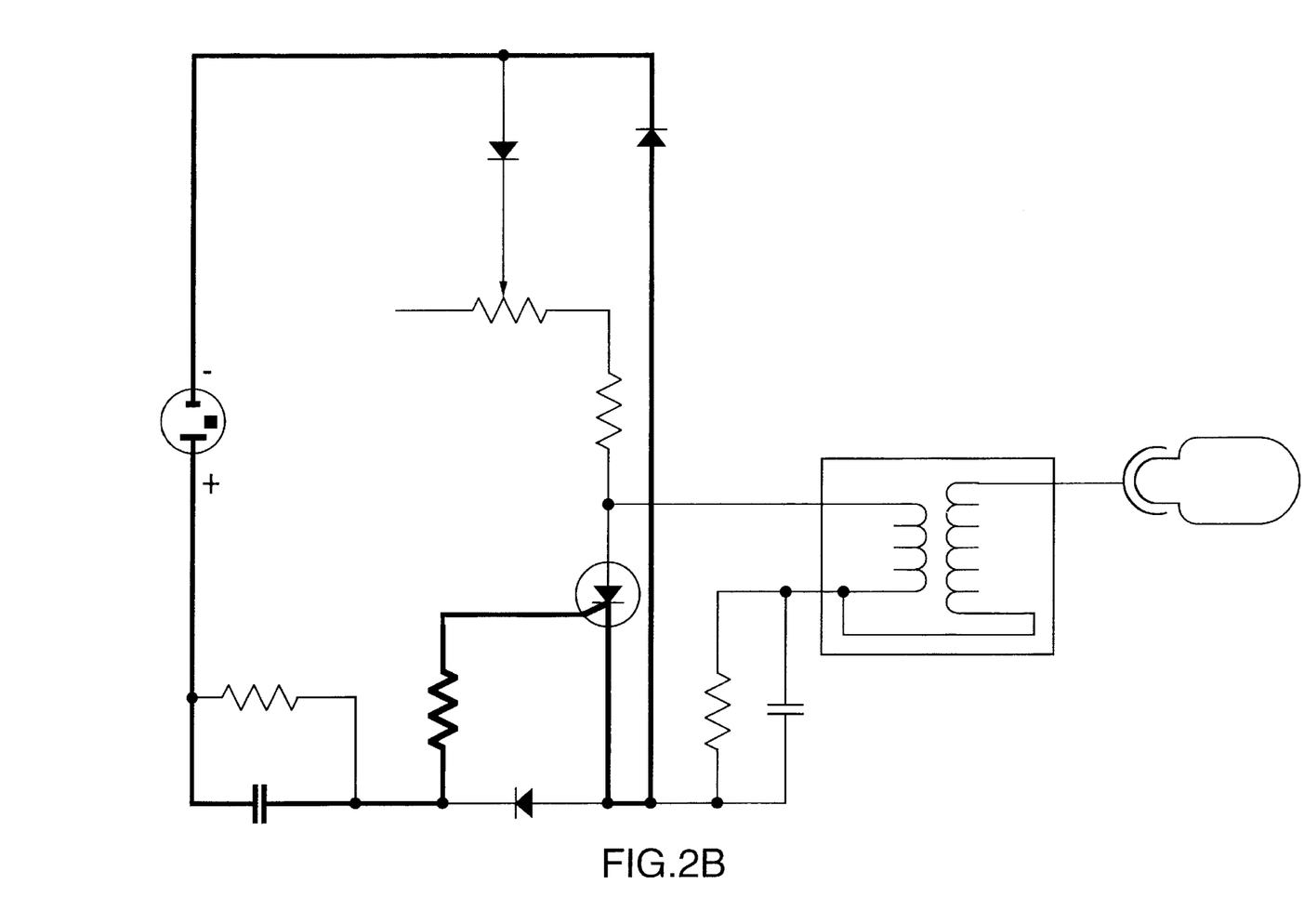
FIG. 2b shows the effect in the negative half.

The auxiliary capacitor C1 is charged during the negative-going half of the AC cycle. This condition is illustrated in FIG. 2b. Now, diode D2 conducts, and charge is applied to C1, as shown.

The spark is produced during the negative-going half of the cycle, i.e while the auxiliary capacitor is being charged. The spark arises following the discharge of the energy stored in the primary capacitor C2 into the primary winding 49 of the spark-inducing transformer 30. Discharge is triggered by the activation of the SCR Q1. Q1 is set to trigger at an appropriate voltage during the negative-going half of the AC cycle. When Q1 is triggered (FIG. 2c), the circuit containing the primary capacitor C2 and the primary winding is completed, whereby the energy stored in the capacitor is discharged into the primary winding.

Figure 2C:
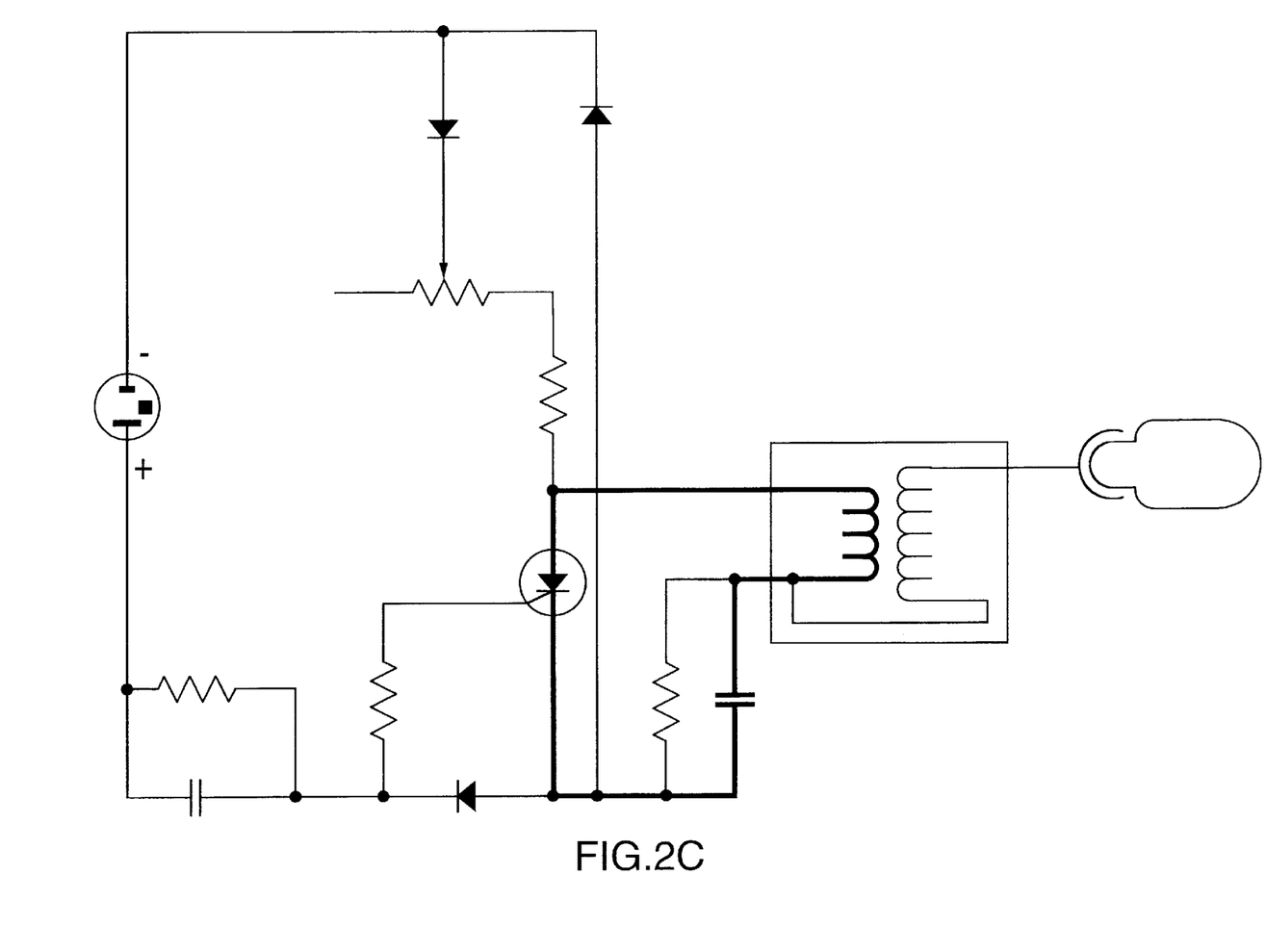
FIG. 2c shows the condition when the primary capacitor discharges into the primary winding.

It is an aim of the invention to make sure that the energy is discharged very rapidly into the primary winding. It may be noted that the quality of the spark produced between the front end 43 of the glass bulb and the person's skin is determined very much by the rapidity with which the capacitor C2 discharges into the primary winding 49. That is to say, the spark should be as short-lived as possible. In order for the capacitor C2 to discharge rapidly, the impedance of the primary circuit should be low. Good results have been obtained when C2 has a capacitance of 470 nano-farads and the primary winding has an inductance of 3.8 micro-Henry at 1 kHz.

The rapidity with which the capacitor C2 discharges is a function of the impedance of the circuit, and of the voltage to which the capacitor is charged. The fact that the voltage to which C2 is charged can be increased above 155 volts is important in reducing the time it takes for the energy in C2 to be discharged into the primary winding. If C2 were confined to 155 volts, the impedance of the circuit would have to be further reduced, in order for the discharge time to be kept small, and it is not practical to reduce the impedance much further. In other words, boosting the voltage to which the primary capacitor C2 is charged means that expensive steps to reduce the impedance of the primary circuit are not needed.

It may be noted that, after discharge, the primary circuit through the SCR Q1 remains closed for the rest of the negative-going half of the AC cycle. Therefore, there is only one discharge (and only one spark) per cycle.

The resistors R3 and R5 serve to limit the voltage to which C2 can be charged. Thus, adjusting the variable resistor R5 serves to adjust the size of the spark.

The resistors R1 and R4 are connected across the respective capacitors, to ensure that the capacitors cannot hold charge for long periods, after the apparatus is switched off. The resistor R2 controls the current in the gate of the SCR Q1.

Figure 3:
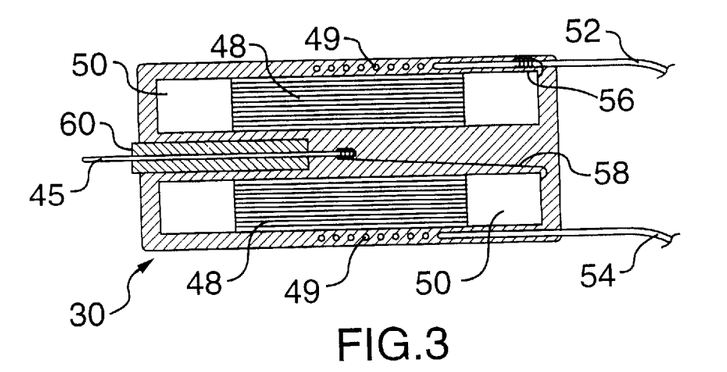
FIG. 3 is a cross-sectioned plan view of the spark-inducing-transformer of the apparatus.

FIG. 3 shows the structure of the spark transformer 30. The primary winding 49 comprises 14 turns of 21 AWG wire. The secondary winding 48 comprises 22 layers of 151 turns of fine (38 AWG) wire. Because the voltage in the secondary can be several thousand volts, insulation is all important. In particular, insulation 50 is needed at the axial ends of the secondary winding, to prevent discharge between the radially-innermost coils of the secondary (where the voltage is highest) and the primary.

The two wires 52,54 by which the spark transformer 30 is coupled into the circuit are the two end-leads of the primary winding 49. Of the two end-leads of the secondary winding 48, the end-lead 56 from the radially-outer coils of the winding 48 is connected to one of the primary end-lead wires 52, and the end-lead 58 from the radially-inner coils, which is the end-lead that is to be connected to the electrode 34, emerges to the rear of the transformer; this inner end-lead 58 is then brought to the front of the transformer by being passed down the centre of the windings. The thin wire 58 is connected to a short length of thicker wire 45, for mechanical robustness. As mentioned, the protruding end of the wire 45 is soldered to the foil of the electrode 34.

Passing the inner end-lead 58 of the transformer secondary lengthwise through the inside of the transformer permits the inner end-lead to be ensleeved in a long insulating sleeve 60, before it emerges from the front end of the transformer structure. As a result, the front end of the transformer can be placed very close up to the foil electrode 34, without a need for insulation therebetween. The arrangement means that the metal components of the apparatus that carry high voltages are as little exposed as possible. And incidentally, the arrangement of the secondary end-leads also saves space, whereby the hand-held structure can be compact.

Figure 4:
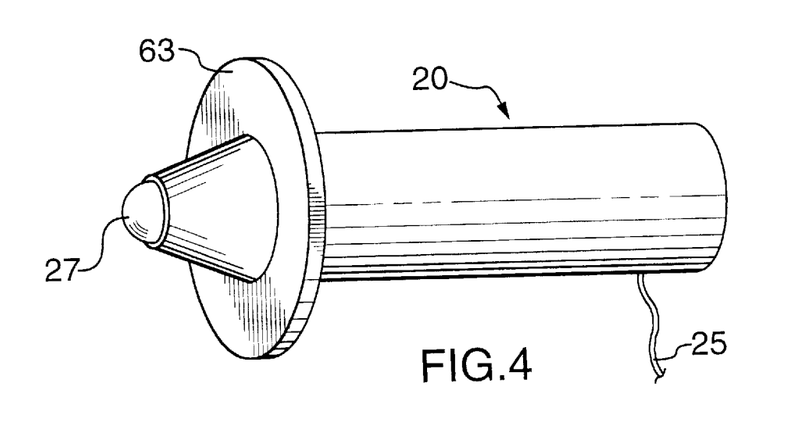
FIG. 4 is a pictorial view of the apparatus.

The large flange 63 on the plastic casing is important for two reasons. First, the flange provides excellent mechanical protection for the glass bulb 27. Of course, it is still possible to knock the bulb against a surface hard enough to break the glass; but the presence of the large flange 63 means that nearly always the portion of the apparatus that comes into accidental contact with other objects is the flange, not the bulb.

The second reason for providing the flange 63 is that the flange prevents the fingers of the hand that is holding the wand from touching the bulb. In fact, the flange prevents the fingers not only from touching the bulb but even from encroaching onto the front end of the wand. The front end of the wand is the place on the wand where the high voltages are located. It can happen that there might be a slight breakdown of insulation, and consequent leakage of discharge; and if this happens at all, it will happen at the front end of the wand. While sparks emanating from the bulb have the therapeutic effect, a discharge of electricity directly from the electrode, even a discharge that has leaked through the insulation and the casing, can be quite painful and unpleasant. The flange 63 means that the person's fingers are protected from such direct discharges from the electrode.

The potting of the cavity 47, around the electrode area and the front of the transformer, in insulative material also serves to reduce the chance of discharges directly to the fingers. The two halves of the casing are provided with grooves 65, and corresponding ridges, which serve to inhibit discharge through the gap between the two halves of the casing. During assembly, the two halves of the casing are glued together, the halves being clamped firmly together as the glue cures.

It has been described that the apparatus is suitable for being powered by 110 volt AC mains electricity. Other standard AC mains can be used, for example 220 volt AC. Also, in some cases, with the addition of suitable voltage step-up means, the apparatus can be powered by a DC battery, or by a low voltage AC supply.

I claim:

1. Hand-held ozone-producing apparatus, wherein:
    the apparatus includes a metal electrode, and a means for generating pulses of high voltage electrical energy in the electrode;
    the apparatus includes a sealed glass bulb;
    the glass bulb includes an electrode-overlying-portion of the glass of the bulb, being a portion that overlies, and is in contact with, the electrode;
    the apparatus includes a plastic casing, which surrounds much of the glass of the bulb, thereby protecting same from exposure to knocks;
    the glass bulb includes an exposed-portion of the glass of the bulb, being a portion that protrudes from the casing, and being a portion that is thereby relatively unprotected from being knocked;
    whereby the exposed-portion of the glass of the bulb is subject to being broken;
    the apparatus includes an attachment-means, for attaching the electrode-overlying-portion of the glass of the bulb to the electrode;
    and the attachment-means is effective to keep the electrode-overlying-portion substantially permanently in place, overlying the electrode, even if the exposed portion of the glass should be broken.

2. Apparatus of claim 1, wherein the attachment means includes a body of adhesive, which is so arranged in the device as to be effective to glue the metal of the electrode to the electrode-overlying-portion of the glass of the bulb.

3. Apparatus of claim 1, wherein the electrode is of metal foil, which lies directly against the electrode-overlying-portion of the glass bulb.

4. Apparatus of claim 1, wherein the apparatus includes a spark-inducing transformer, having a secondary winding, in which is generated a high voltage pulse, and having an end-lead wire from the secondary winding;
    and the electrode is in electrical contact with the end-lead wire from the secondary of the transformer.

5. Apparatus of claim 4, wherein the apparatus includes a means for insulating the electrode;
   the means comprises a tube, which is applied over the electrode and the end-lead wire;
   the tube is of insulating material of the kind that, when heated, shrinks and grips itself securely around the electrode and wire.

6. Apparatus of claim 5 wherein the spark-inducing transformer is formed with a hollow centre, and the said end-lead wire connecting the high-voltage secondary wire to the electrode passes through the hollow centre of the transformer, over substantially the full length thereof.

7. Apparatus of claim 1, wherein the casing includes a large flange, which is so dimensioned and arranged on the casing as to substantially protect the bulb from being knocked, and as to prevent the bulb from being touched by the fingers of a person holding the apparatus in the hand.

8. Apparatus of claim 1, wherein:
   the attachment means includes a body of adhesive, which is so arranged in the device as to be effective to glue the metal of the electrode to the electrode-overlying portion of the glass of the bulb;
   the electrode is of metal foil, which lies directly against the electrode-overlying-portion of the glass bulb;
   the apparatus includes a spark-inducing transformer, having a secondary winding, in which is generated a high voltage pulse, and having an end-lead wire from the secondary winding;
   the electrode is in electrical contact with the end-lead wire from the secondary of the transformer;
   the apparatus includes a means for insulating the electrode;
   the means comprises a tube, which is applied over the electrode and the end-lead wire;
   the tube is of insulating material of the kind that, when heated, shrinks and grips itself securely around the electrode and wire;
   the spark-inducing transformer is formed with a hollow centre, and the said end-lead wire connecting the high-voltage secondary wire to the electrode passes through the hollow centre of the transformer, over substantially the full length thereof;
   the casing includes a large flange, which is so dimensioned and arranged on the casing as to substantially protect the bulb from being knocked, and as to prevent the bulb from being touched by the fingers of a person holding the apparatus in the hand.

9. Hand-held ozone-producing apparatus, wherein:
   the apparatus includes a metal electrode, and a spark-generating-means for generating pulses of high voltage electrical energy in the electrode;
   the apparatus includes a sealed glass bulb;
   the glass bulb includes an electrode-overlying-portion of the glass of the bulb, being a portion that overlies, and is in electrical contact with, the electrode;
   the spark-generating-means includes a primary capacitor, and a spark-inducing-transformer having a primary winding;
   the spark-generating-means includes a switching means, which is effective, when switched, to release electrical energy stored in the primary capacitor suddenly into the primary winding of the spark-inducing-transformer;
   the spark-generating-means includes a voltage-boosting-means for charging the primary capacitor to a voltage V, where the voltage V is more than 200 volts;
   the apparatus includes a casing, which is of such a size and shape as to be suitable to be held in the hand;
   the casing is a substantially unitary structure, having an enclosed hollow interior;
   and the voltage-boosting means lies housed within the hollow interior of the hand-held casing.

10. Apparatus of claim 9, wherein:
   the spark-generating-means is adapted to be powered by AC mains-electricity;
   the apparatus includes an electrical lead for conveying mains-voltage electricity;
   the said lead has a plug for plugging into the mains at its far end, and is arranged to convey AC mains-voltage electricity therefrom directly into the casing.

11. Apparatus of claim 10, wherein:
   the apparatus includes a means for conducting mains-voltage electricity to the spark capacitor during a first-going half of the AC cycle, thereby charging the capacitor to a voltage V1;
   the switching means is effective to close the primary circuit, thereby causing the capacitor to discharge into the primary winding, during the other-going half of the AC cycle;
   the voltage-boosting-means includes an auxiliary-capacitor, and a means for charging the auxiliary capacitor during the other-going half of the AC cycle.

12. Apparatus of claim 11, wherein the apparatus includes means for aggregating the voltage stored in the auxiliary capacitor to the mains-voltage, and thereby enabling the primary capacitor to be charged to a higher voltage than the peak voltage of the AC mains.

13. Apparatus of claim 11, wherein V1 is the peak voltage of 110 volts AC mains, being about 155 volts.

14. Apparatus of claim 9, wherein the components of the spark-generating-means, being the spark-inducing transformer, the primary capacitor, the switching means, and the voltage-boosting means, are all housed within the hollow interior of the casing.

15. Apparatus of claim 9, wherein the primary winding of the spark-inducing transformer has an inductance of about 3.8 micro-Henry at 1 kHz, and the primary capacitor has a capacitance of about 470 nano-Farad.

16. Apparatus of claim 9, wherein:
   the apparatus includes a plastic casing, which surrounds much of the glass of the bulb, thereby protecting same from exposure to knocks;
   the glass bulb includes an exposed-portion of the glass of the bulb, being a portion that protrudes from the casing, and being a portion that is thereby relatively unprotected from being knocked;
   whereby the exposed-portion of the glass of the bulb is subject to being broken;
   the apparatus includes an attachment-means, for attaching the electrode-overlying-portion of the glass of the bulb to the electrode;
   and the attachment-means is effective to keep the electrode-overlying-portion substantially permanently in place, overlying the electrode, even if the exposed portion of the glass should be broken.

* * * * *